United States Patent
Banner et al.

(10) Patent No.: US 8,611,690 B2
(45) Date of Patent: Dec. 17, 2013

(54) REAL-TIME VIDEO DEBLURRING

(75) Inventors: Ron Banner, Haifa (IL); Carl Staelin, Haifa (IL); Pavel Kisilev, Maalot (IL); Sagi Schein, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 142 days.

(21) Appl. No.: 13/387,333

(22) PCT Filed: Oct. 21, 2009

(86) PCT No.: PCT/US2009/061542
§ 371 (c)(1),
(2), (4) Date: Mar. 1, 2012

(87) PCT Pub. No.: WO2011/049565
PCT Pub. Date: Apr. 28, 2011

(65) Prior Publication Data
US 2012/0155785 A1    Jun. 21, 2012

(51) Int. Cl.
*G06K 9/40* (2006.01)
*G09G 5/00* (2006.01)
*H04N 1/407* (2006.01)

(52) U.S. Cl.
USPC .................. 382/264; 345/615; 358/3.26

(58) Field of Classification Search
USPC ......... 382/254, 255, 265, 279, 298, 299, 312; 348/533, 581; 345/615, 660; 358/1.2, 358/3.26, 3.27, 528
See application file for complete search history.

(56) References Cited

U.S. PATENT DOCUMENTS

| | | | |
|---|---|---|---|
| 3,920,889 A | 11/1975 | Connor | |
| 5,696,848 A * | 12/1997 | Patti et al. | 382/254 |
| 6,993,204 B1 * | 1/2006 | Yahil et al. | 382/265 |
| 7,428,019 B2 * | 9/2008 | Irani et al. | 348/581 |
| 7,477,802 B2 * | 1/2009 | Milanfar et al. | 382/299 |
| 7,884,854 B2 | 2/2011 | Banner et al. | |
| 8,115,840 B2 * | 2/2012 | Litvinov et al. | 348/280 |
| 8,305,485 B2 * | 11/2012 | Kane et al. | 348/348 |
| 8,306,348 B2 * | 11/2012 | Cohen et al. | 382/254 |
| 8,380,000 B2 * | 2/2013 | Lee et al. | 382/255 |
| 8,406,564 B2 * | 3/2013 | Sun et al. | 382/279 |

(Continued)

FOREIGN PATENT DOCUMENTS

WO    WO2009/073006    6/2009

OTHER PUBLICATIONS

Frigo M. Leiserson, C.E. Prokop, H. Ramachandran, S., "Cache-oblivious algorithms", IEEE FOCS 1999.

(Continued)

*Primary Examiner* — Kanjibhai Patel

(57) ABSTRACT

A method of reducing blurring in an image of size greater than M columns by N rows of pixels, comprises deriving a blur kernel k representing the blur in the image, and deriving an inverse blur kernel $k^{-1}$. The inverse blur kernel is given by (I) where h(m) is the sum of the first m terms of the series (II) δ is the Dirac delta, m is greater than 1, and h(m) is a two dimensional matrix of size M×N. The two dimensional matrix h(m) is convolved with the image over the whole image in the image pixel domain to produce an image with reduced blur. The method may be applied to a video sequence allowing the sequence of images to be deblurred in real time.

15 Claims, 4 Drawing Sheets

(56) References Cited

U.S. PATENT DOCUMENTS

| | | |
|---|---|---|
| 2005/0231603 A1 | 10/2005 | Poon |
| 2007/0086675 A1 | 4/2007 | Chinen et al. |
| 2007/0098292 A1 | 5/2007 | Batur |
| 2008/0131017 A1 | 6/2008 | Borel et al. |
| 2008/0240607 A1 | 10/2008 | Sun et al. |
| 2009/0034863 A1 | 2/2009 | Kisilev et al. |

OTHER PUBLICATIONS

International Search Report and Written Opinion for PCT Application No. PCT/US2009/061542 Korean Intellectual Property Office Jun. 25, 2010.

* cited by examiner ly fixed
REAL-TIME VIDEO DEBLURRING

CLAIM FOR PRIORITY

The present application is a national stage filing under 35 U.S.C 371 of PCT application number PCT/US2009/061542, having an international filing date of Oct. 21, 2009, which is incorporated by reference in its entirety.

BACKGROUND

It is known to reduce blurring of an image. Known methods are summarised in for example US-A1-2007/0098292. Known methods operating in the frequency domain are slow in that they require the whole image to be transformed to the frequency domain before deblurring can take place. Another method disclosed in US-A-2008/0240607 requires multiple iterations: It states "In one implementation, iteration is very fast using a Fast Fourier Transform, taking approximately 8 to 12 seconds for a 64×64 kernel and an 800×600 image".

It is desirable to provide a method of reducing blurring which can be carried out more quickly.

BRIEF DESCRIPTION OF THE DRAWINGS

Features and advantages of embodiments of the invention will become apparent from the following description of illustrative embodiments of the invention, given by way of example only, which is made with reference to the accompanying drawings.

DETAILED DESCRIPTION OF ILLUSTRATIVE EMBODIMENTS OF THE INVENTION

Inexpensive still image and video capture devices such as cell phones, web cameras, surveillance cameras and other low cost capture devices have become widespread. These devices are usually characterized by a considerable amount of blur and a relatively low quality. One way to alleviate this difficulty is to employ image enhancement tools to augment their quality. In cases of mild visual degradation, it would probably be sufficient to employ standard enhancement techniques (e.g. sharpening) to achieve the desired visual quality. However, in cases of more pronounced blur such techniques might not be sufficient. It is desirable to reduce the blur in an image: this is referred to below as image deblurring.

Image deblurring attempts to reduce the blurring in an image using apriori knowledge of the degradation phenomenon. Thus, deblurring techniques attempt to model the degradation processes and applying its inverse to recover the original image. Accordingly, when significant degradations are induced, deblurring solutions might be more effective than traditional solutions. Unfortunately, the above levies a price. Deblurring techniques are usually more complicated, time consuming and difficult to implement. If we focus on real-time video where algorithms should operate within a strict timing regime, the problem becomes even more difficult. The following discussion is concerned with a video sequence but it will be appreciated that the techniques described below may be applied to a still image. The following discussion assumes an imaging system is relatively fixed and the scene has limited depth; in those circumstances we can robustly estimate the blur kernel and, as a result, devise an efficient deblurring algorithm. The scheme for deblurring video frame sequences described below may operate in real-time.

We assume that we are given a blurry image which may be an image of a video frame sequence. The blurring process of each frame is modelled as a blurring function that, together with an additive noise term, operates on an input frame Ito produce a blurry frame B. When the space-invariant model of image degradation is approximately satisfied, the blurry frame can be modelled as: B=I$\Box$*k+n, where k is the blur kernel which is assumed to change slowly with time, n is an additive noise term and $\Box$* denotes the convolution operator. The illustrative embodiment of the invention described hereinafter seeks to reduce the blur in the frame sequence in real-time.

Figure 1:
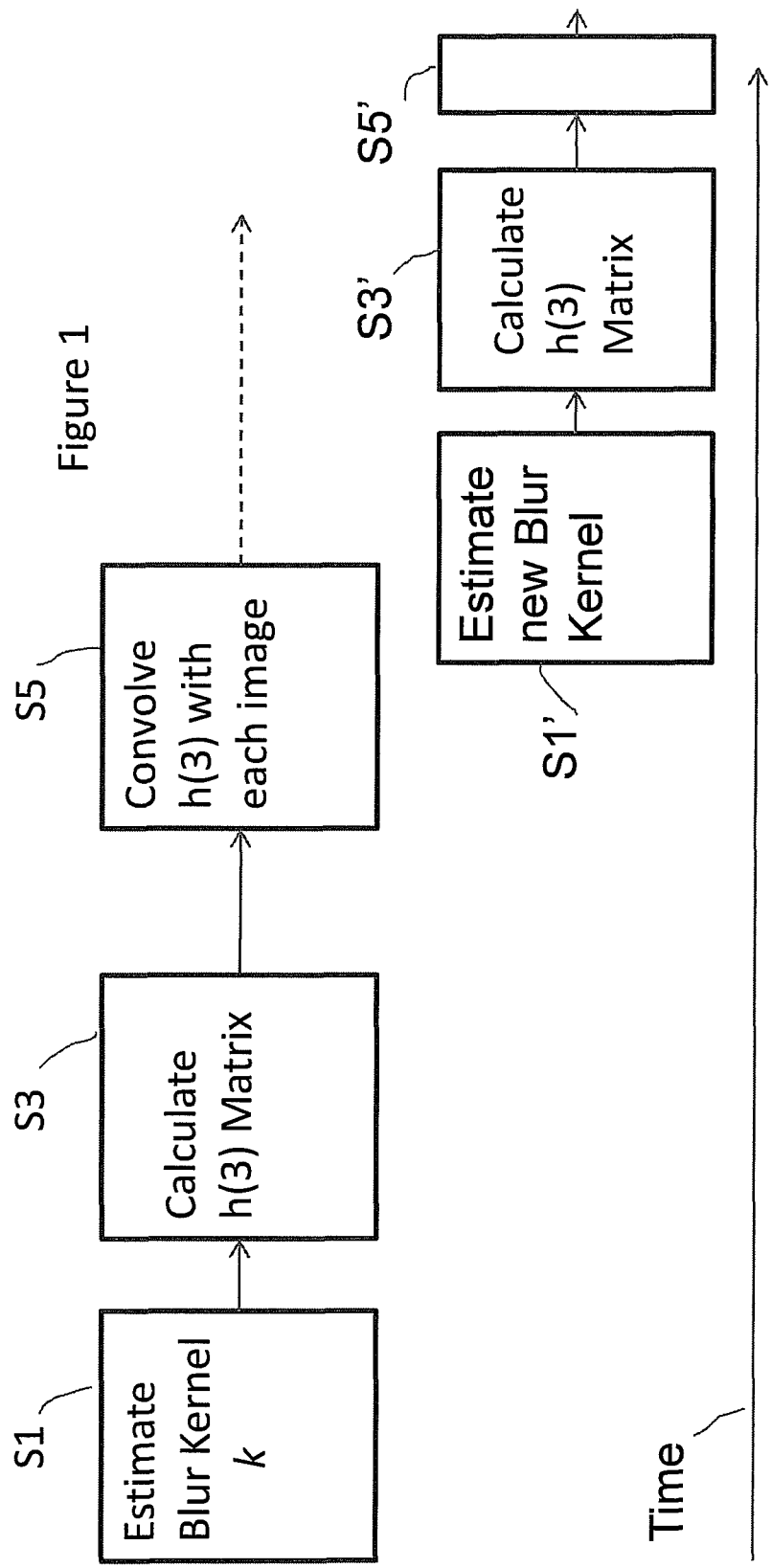
FIG. 1 is a flow chart of the main phases of a deblurring operation.

Referring to FIG. 1, the illustrative embodiment has three phases. The first phase S1 consists of determining the blur kernel k, and the second phase S3 estimates its inverse h(3) as a matrix as will be described below. Phases 1 and 2 do not need to be done at real-time. The third phase is a real-time phase S5 in which each frame of a video sequence is deblurred by convolving it with the matrix h(3).

In a studio setting, the depth of the room is small and constant. Therefore, the blur kernel is quasistatic and does not have to be estimated independently for each frame. Instead the blur can be approximated once in a while in a non-real time fashion and then fed back to the system.

Methods of estimating blur kernels are known: see for example US-A-2007/0098292 (Texas Instruments). In the present embodiment the blur kernel estimation is performed based on the approach described hereinbelow with reference to FIGS. 3 and 4. The output of one such blur estimation phase in general has a Gaussian shape with ripples due to diffractions. Such a blur structure was obtained from a particular image acquisition device and complies with blur structures of other image acquisition devices that have recently been obtained when the impulse response of these devices was measured directly.

Given the estimated blur kernel k, our goal is to deblur each input frame by deconvolving it from the estimated blur kernel. Unfortunately, as will be explained soon, standard deconvolution approaches are too slow for real time video deblurring. Therefore, in this work we define the de-convolution process as a convolution by the inverse $k^{-1}$ of the blur kernel i.e., the de-convolution process would be the convolution between the blurry image B and the inverse kernel $k^{-1}$ as described in equation (1).

$$I = k^{-1} \Box * B \qquad (1)$$

Unfortunately, it is well known that the inverse blur kernel, $k^{-1}$, usually does not exist and if it existed, it would require a very large, if not infinite, resource to implement a deblurring operation. As a result, the challenge is to find an approximate de-blur kernel, $k^{-1}$, that can be used to deblur an image using a practical resource.

Given a blur kernel x, let $x^n$ represents the result that is achieved by convolving x with itself for n−1 times as formulated in (2).

$$xn \equiv \underbrace{x * x * \ldots * x}_{n-1} \quad (2)$$

Denoting by δ the Dirac function, let h(m) represent the expression that is formulated in (3) for each integer m.

$$h(m) \equiv \sum_{n=0}^{m} (\varepsilon - k)^n \quad (3)$$

In the following we show that equation (4) is satisfied for any small blur kernel k (i.e., it holds for blur kernel k that max($\Im(k)$)<1, where $\Im(\bullet)$ denotes the Fourier Transformation)

$$h^{-1} = \lim_{m \to \infty} h(m) = \sum_{n=0}^{\infty} (\delta - k)^n \quad (4)$$

We will focus on 1D signals (the generalization for 2D signals is straightforward). In order to identify an expression for $k^{-1}$, we will first write (1) in a matrix form. That is, given the blur kernel k, it is always possible to find a square matrix K such that the convolution between I and k is the same as the matrix product between I and K i.e.

$$I\square*k = IK \quad (5)$$

From (1) it holds that the blurry image B is the product between the sharp image I and the matrix K i.e.

$$B = IK \quad (6)$$

Denoting by 1 the identity matrix, it holds by (6) that $$B = I(1 - (1 - K)) \quad (7)$$

Next, recall that our goal is to find an approximate inverse kernel h so that h*B is approximately the sharp image I. Therefore, in matrix form we seek a deblurring matrix H such that the product between H and the blurry image B will be the sharp image I i.e.

$$I = BH \quad (8)$$

Substituting (8) in (7) we get $$B = B \times H \times (1 - (1 - K)) \quad (9)$$

Therefore, the deblurring matrix H is such that satisfies that the product between H and (1−(1−K)) is the identity matrix 1 i.e.

$$H(1 - (1 - K)) = 1 \quad (10)$$

In other words, if the determinate of (1−(1−K)) is non-zero the deblurring matrix H would satisfy $$H = [(1 - (1 - K))] \quad (11)$$

Let D be the difference matrix between 1 and K i.e., D=K−1. Since we assume that the blur kernel is small, the difference between matrix K and the identity matrix is small i.e., D≈0. Thus, it holds (see [7]) that $$H = [(1 + D)]^{-1} = 1 - D + D2 - D3 + D4 + \quad (12)$$

Thus, we get $$H = 1 - (K-1) + (K-1)^2 - (K-1)^3 + (K-1)^4 - \ldots = \sum_{n=0}^{\infty} (1-K)^n \quad (13)$$

Equation (13) is an infinite series that composes the deblurring matrix H. Since according to (11) it holds that H=K$^{-1}$, it shows that the inverse blur kernel satisfies the following.

$$k^{-1} = \lim_{m \to \infty} h(m) = \sum_{n=0}^{\infty} (\delta - k)^n \quad (14)$$

Recall that h(m) is defined to be the sum of the first m terms in the above series: see equation (3). Therefore, the parameter m determines how good h(m) approximates the deblurring kernel h. In this example of the invention, we choose for a video system m=3. In which case, the deblur kernel $k^{-1}$ is approximated by the right side of equation (15). (As an aside, one might note that h(1) is the equation for a mask for unsharp masking. Unsharp masking is described in US 2009/0034863)).

$$k^{-1} \approx h(3) = \delta - 6k + 4k^2 - k^3 \quad (15)$$

In a further example m has a value of 4. In other examples m may have a value in the range 2≤m≤5. In yet other examples, m may have values greater than 5. The value of m may be in the range 2≤m≤20. The value of m is chosen taking account of the processing power available, the time available for processing, and the degree of deblurring desired. By way of example, for m=2, $$h(2) = 3\delta - 3k + k^2.$$

In order to deblur the original sequence, in this example, we convolve (S5 in FIG. 1) the deblur kernel h(3) with each image of the input image sequence in the pixel domain to yield the reconstructed image sequence. For small deblur kernels, this convolution can be performed in real-time. We may approximate the 2D deblur kernel with two successive 1D convolution on rows and columns: this may improve the performance.

The deblur kernel may be newly estimated from time to time from images in the video sequence as indicated by steps S1' to S3' in FIG. 1. The new estimate may be produced in non-real time whilst a previous sequence of images is deblurred as indicated by S1, S3 and S5 in FIG. 1, based on a previous estimate S1 of the blur kernel.

Given a 2D deblur kernel h(3) of size M×N, this approximation is done by solving the following optimization problem, $$\operatorname{argmin}_{x,y} \|h - x.y\|_2^2$$

where x is a column vector of size M and y is row vector of size N. This optimization problem can be solved by employing the singular value decomposition (SVD) factorization.

As with any other deblurring solution, the deblurring algorithm tends to amplify existing noise. One way to resolve this difficulty is to regularize the input before we try to restore the original so that noise is suppressed while image features are preserved. In the case of video deblurring, we can employ both spatial and temporal information which can greatly improve the quality of denoising and, as a result, the quality of restoration. To that end, we use spatial nonlinear multiscale denoising in an example of the invention but any suitable spatial filter may be used.

Figure 2:
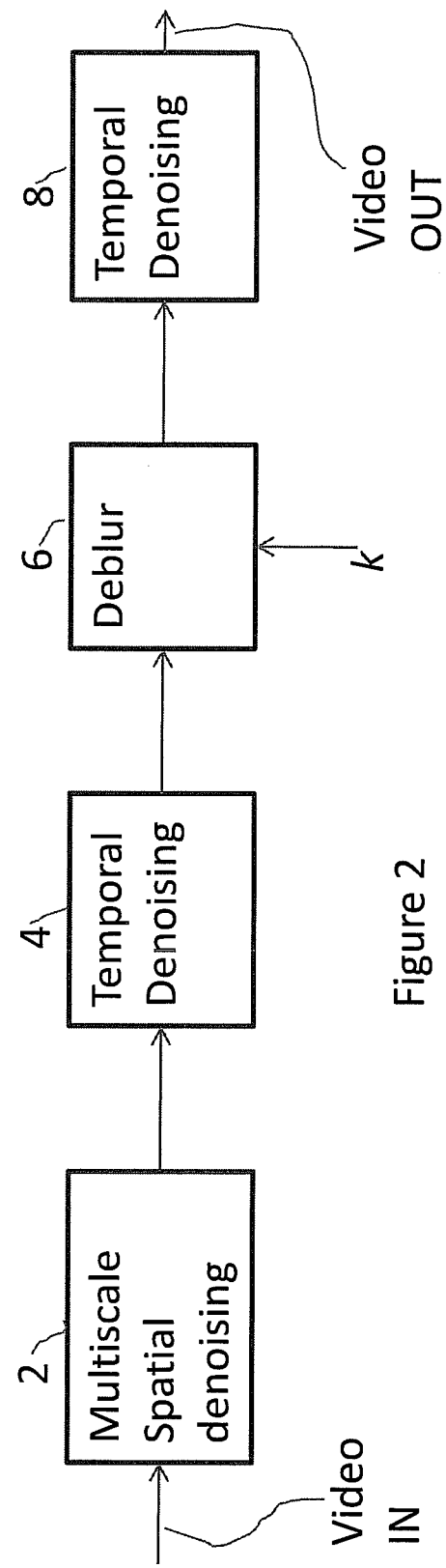
FIG. 2 is a block diagram of an illustrative embodiment of apparatus for deblurring a video sequence.

Referring to FIG. 2, an illustrative apparatus for deblurring a video sequence comprises an input IN for receiving the video sequence. The apparatus operates entirely in the pixel domain. The frames of the sequence comprise pixels represented digitally. In this example the frames are assumed to be monochrome represented only by luminance information. A multiscale spatial denoising filter 2 spatially filters the frames of the video sequence; that is it performs filtering only on pixels within a frame. An example of such a filter is described in US-A-2009/034863 (Pavel Kisilev and Suk Hwan Lim). The spatially filtered frames may be subsequently temporally filtered in a temporal filter 4. A temporal filter acts on pixels in adjacent frames: such a filter is well known. Any suitable temporal filter may be used. In an example of a spatial filter successive frames of video are stored in frame stores pixels from successive frames are combined. One example of such a filter is described in U.S. Pat. No. 3,920,889. The spatially (and temporally) filtered frames are then deblurred in a convolution processor 6 by convolving them with the matrix h(3) of equation 15 above. Convolution is well known and described in US-A-2009/034863. The deblurred images of the video sequence may be temporally filtered by a filter 8 similar to temporal filter 4.

The apparatus of FIG. 2 has both temporal and spatial filters 2 and 4. One or both of those filters may be omitted. The temporal filter 8 may be omitted. Spatial filtering may be applied to the deblurred image if desired in addition to, or in place of, temporal filtering. The spatial filter applied to the deblurred image may be similar to spatial filter 2.

The apparatus of FIG. 2 may be implemented in hardware, or by a software routine, or by a mixture of hardware and software. An example of the apparatus of FIG. 3 comprises an HP wx8200 computer with an Nvidia 8800 ultra GPU. The GPU, a graphics processor, convolves the frames of the video sequence with the matrix h(3).

The chosen approximation h(3) to the inverse blur kernel $k^4$ together with convolving h(3) with the frames of the video sequence in the pixel domain makes it possible to deblur a video sequence in real time using a suitable processor, (in this example an HP wx8200 computer with an Nvidia 8800 ultra GPU). Because the deblurring is carried out in the pixel domain, there is no requirement, as in use of the spatial frequency domain, to wait until the whole frame has been transformed to the spatial frequency domain.

The above embodiments are to be understood as illustrative examples of the invention. Further embodiments of the invention are envisaged. For example, although the invention has been illustrated by reference to deblurring a video sequence, the technique of the invention may be applied to a single still image. The blur kernel k may be estimated in non real time separately from deblurring the video sequence. Alternatively, it may be estimated in real time from an image of the video sequence or, if the teaching of US 2007/0098292 is followed, from two images of the sequence. One illustrative way of obtaining the blur kernel from a single image which may be one of the images of the video sequence is described below with reference to FIGS. 3 and 4.

Optical blurs typically result from problems with depth of field, lens aberration, aperture shutter shape, and aperture speed related to the imaging system 100. A digital image that is blurred due to optical blurriness can be at least substantially deblurred by embodiments of the present disclosure that are described herein.

Figure 3:
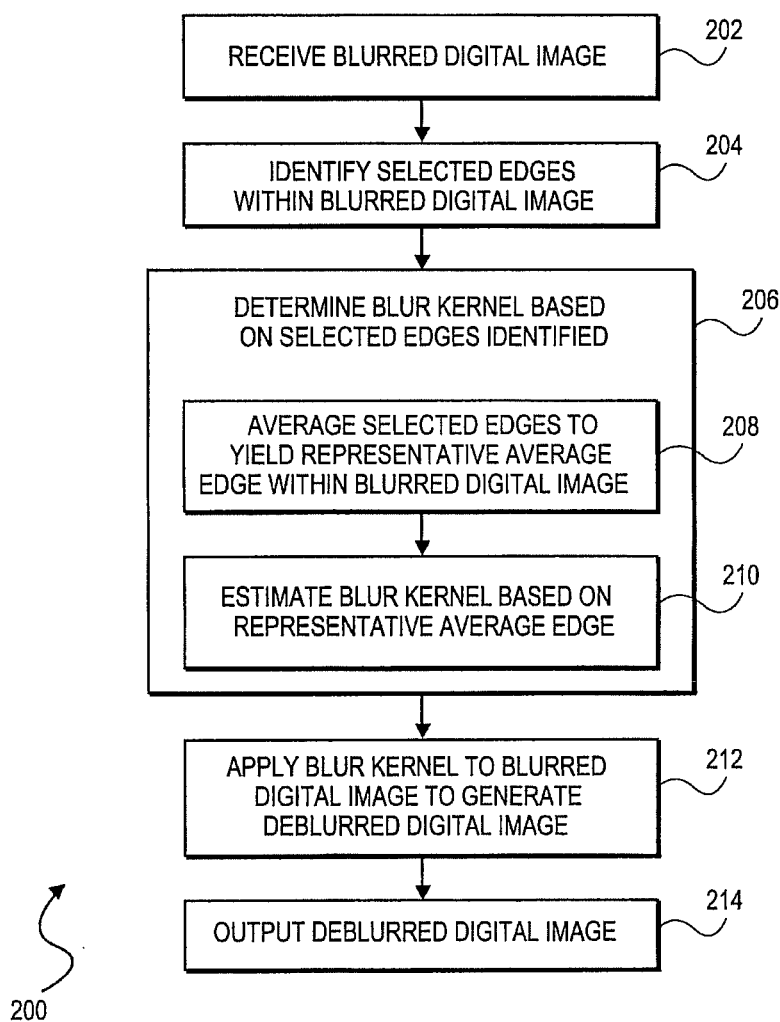
FIG. 3 is a flowchart of a method for deblurring a blurred digital image having at least substantially uniform blurriness, according to an embodiment of the present invention.

FIG. 3 shows a method 200 for obtaining a blur kernel and deblurring a blurred digital image, to generate a corresponding deblurred digital image according to an illustrative embodiment of the invention. A digital image can be considered digital data that represents an image. Such a digital image may be captured by a digital camera, for instance, and stored in a given digital image file format, including but not limited to the JPG and TIF formats, as known within the art.

The method 200 of FIG. 3 particularly presumes that the digital image in question has at least substantially uniform blurriness throughout the digital image, although it can be performed in relation to blurred digital images that do not have at least substantially uniform blurriness. The method 200 may be implemented as one or more computer programs stored on a computer-readable medium. Examples of such computer-readable media include optical, semiconductor, and/or magnetic media.

The blurred digital image is received (202). For instance, the blurred digital image may be captured by a digital camera, or transferred from a computer-readable medium and/or over a network. The digital image is said to include a number of different physical objects represented within the image, as well as a number of edges. The edges demarcate boundaries between the objects. Because the digital image is blurred, these edges are, in particular, blurry.

One or more selected edges are identified within the blurred digital image (204). The selected edges have two qualities. First, the selected edges correspond to edges between objects within the digital image. Second, the selected edges are blurry edges within the digital image, but were originally sharp edges. This can mean, for instance, that if the blurred digital image were not blurry, then the selected edges would in fact be sharp, non-blurry edges, insofar as they represent edges between objects within the image. Such selected edges are in comparison to edges that would be blurry even if the blurred digital image were not blurry, due to the edges not being edges between objects within the image, for example.

In one embodiment, it has been inventively determined that color edges within the blurred digital image correspond to such selected edges. Each such color edge demarcates boundaries between two different colors within the blurred digital image. Thus, locating such color edges can be used to locate the selected edges, because it has been inventively determined that edges between two different colors correspond to edges between different objects within the blurred digital image that should be sharp but that are not within the blurred image. While other, non-color edges may also exist within the blurred digital image that also should be sharp, the presence of the color edges provides one manner by which the selected edges in question can be identified.

Once the selected edges within the blurred digital image have been identified, a blur kernel is determined (206). The blur kernel can be generally considered as denoting how the blurred digital image is blurry. More specifically, within the relationship g=D*f, where f is the deblurred, sharp digital image, g is the blurred digital image, and * is the convolution operator, D is the blur kernel. For a selected edge n, g(n)=D (n)*f(n). It has been inventively determined that D(n)=g(n)−g(n−1), which those of ordinary skill within the art can appreciate permits the blur kernel to be determined and derived from the selected edges that have been identified within the blurred digital image, as is now described in more detail.

Figure 4:
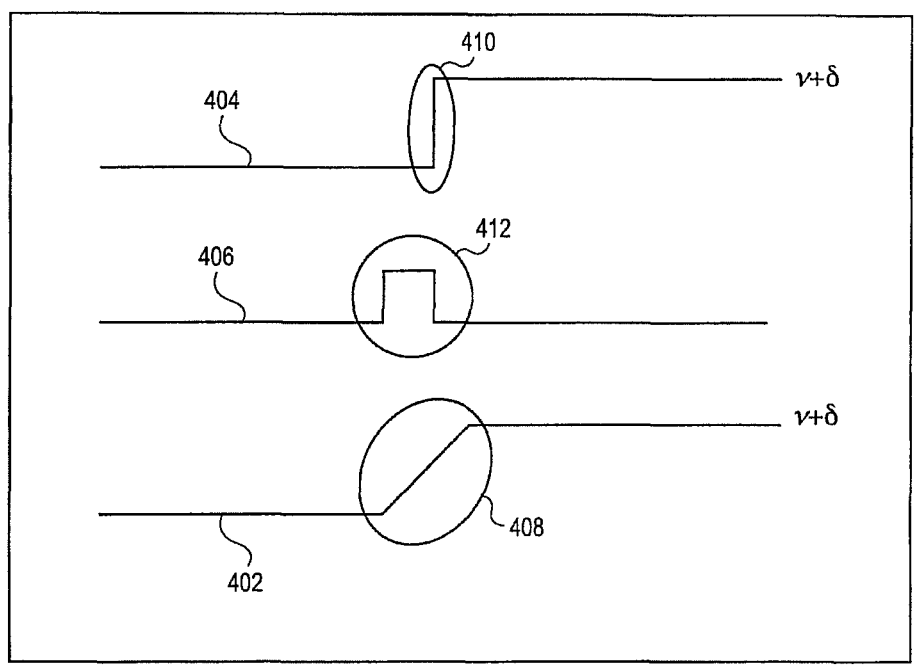
FIG. 4 is a diagram depicting a blur model that is used to generate a blur kernel to deblur a blurred digital image, according to an embodiment of the present invention.

FIG. 4 illustratively depicts a blur model 400 representative of the relationship g=D*f, according to an embodiment of the present disclosure. Within the blur model 400, the line 402 represents a one-dimensional transition within the blurred digital image, and the line 404 represents a corresponding one-dimensional sharp transition within the deblurred digital image corresponding to the blurred digital image. The line 406 represents a one-dimensional blur kernel.

There is a one-dimensional sharp transition 410 within the line 404 corresponding to the deblurred digital image, and which is a one-dimensional optimal step. In the blurred digital image, by comparison, the corresponding transition 408 within the line 402 is at an angle, corresponding to the sharp transition within the deblurred, or sharp, digital image having been blurred. This transition 408 particularly results from performing the convolution operation in relation to the sharp transition 410 and a pulse 412 of the blur kernel represented by the line 406. That is, performing the convolution operation on the sharp transition 410 and the pulse 412 results in the transition 408. As can be appreciated by those of ordinary skill within the art, convolution is a mathematical operation that takes a first function and a second function (such as the sharp transition 410 and the pulse 412) and generates a third function (such as the transition 408) that is a modified version of either or both of the first and the second functions. Thus, the deblurred or sharp edge corresponding to a blurred edge within the blurred digital image is modeled as a one-dimensional step via the line 404.

The model 400 thus illustrates that for a given blurred edge, the blur kernel that corresponds to this blurred edge is the derivative of the blurred edge. For example, the line 406 represents the derivative of the line 402. In this way, the blur kernel is determined. Furthermore, because for a selected edge n, g(n)=D(n)*f(n), the sharp, deblurred edge can then be obtained from the blur kernel and the blurred edge. That is, the line 404 can be obtained where the lines 402 and 406 are known or determined.

Referring back to FIG. 3, to achieve robustness, in one embodiment the blur kernel is determined based on the selected edges that have been identified as follows. The selected edges are averaged to yield a representative average edge within the blurred digital image (208). For example, in part 204 edges may have been selected by first convolving each pixel within the image using the kernels [−1, 1] and [1, −1], which yields transition values, or grades, for the pixels, where a larger transition value or grade corresponds to a greater likelihood that a given pixel belongs to an edge. Second, the edges are selected by choosing those pixels having greater transition values, such as transition values greater than a predetermined threshold. These selected edges are then averaged in part 208 by averaging their transition values.

The blur kernel is then estimated based on this representative average edge (210). That is, where it is known that the representative average edge of the blurred digital image corresponds to an optimal sharp transition or edge of the deblurred digital image, the blur kernel is estimated or determined by taking the derivative of the representative average edge. This is because, as has been noted above, D(n)=g(n)−g(n−1), as can be appreciated by those of ordinary skill within the art. In one embodiment, the averaging that is performed can be a weighted averaging. The weight given to each edge can in one embodiment correspond to a likelihood that the edge in question is an edge that was originally sharp prior to having been blurred, as opposed to an edge that was originally blurry.

It is further noted that the method 200 of FIG. 3 presumes at least substantially uniform blurriness throughout the blurred digital image in question. Therefore, the blur kernel can be estimated based on any given selected edge. However, averaging all the selected edges that have been identified to yield a representative average edge, as in part 208, is nevertheless advantageous, since in actuality slight differences between the selected edges may exist.

The blur kernel and the deblurred digital image is generated in the method 200 based completely and exclusively on information obtained from the blurred digital image itself. In other words, the generation of the deblurred digital image is not generated based on any external information as to how the blurred digital image was generated. Such external information might include information regarding the imaging system that was employed to initially capture the blurred digital image. The method 200 is thus advantageous, because it permits deblurring to be performed even where such external information is unavailable.

The deblurred digital image is ultimately output (214). For instance, the deblurred digital image may be displayed on a display device, or printed on a medium like paper using a printing device. As other examples, the deblurred digital image may be stored on a computer-readable medium, or electronically transmitted, such as over a network, for example the Internet.

The embodiments of the invention may be implemented by software, which when run on a suitable processor causes the processor to implement the method and apparatus described above. The software may be on a carrier for example a computer readable medium. The computer readable medium may be: a disc for example a CD, a DVD or Blu Ray® disc or any other suitable disc; a tape: an electronic storage medium for example a Flash memory RAM, ROM or any other suitable electronic storage; or a magnetic storage medium, for example a hard disk drive.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of reducing blurring in an image of size greater than M columns by N rows of pixels, comprising
deriving a blur kernel k representing the blur in the image,
deriving an inverse blur kernel $k^{-1}$ where $$k^{-1} = h(m) = \sum_{n=0}^{m} (\delta - k)^n$$

where h(m) is the sum of the first m terms of the series $$\sum_{n=0}^{m} (\partial - k)^n$$

$\delta$ is the Dirac delta, $2<m<20$, and h(m) is a two dimensional matrix of size M×N, and
convolving the two dimensional matrix h(m) over the whole image in the image spatial domain to produce an image with reduced blur.

2. A method according to claim 1, wherein the matrix is convolved with the image as two one dimensional matrices.

3. A method according to claim 1, wherein m=3 and $h(3)=4\delta-6k+4k^2-k^3$.

4. A method according to claim 1, comprising:
reducing blurring of a video sequence of images, each of size greater than M×N; and
convolving each image with the said two dimensional matrix h(m) in the image spatial domain.

5. A method according to claim 1, further comprising applying a spatial filter to the image to reduce spatial noise in the image prior to convolving the image with the said matrix h(m).

6. A method according to claim 1, further comprising applying a temporal filter to the image to reduce temporal noise in the image after convolving the image with the said matrix h(m).

7. A method according to claim 1, comprising:
reducing blurring of a video sequence; and
applying a temporal filter to images in the sequence image to reduce temporal noise in the images prior to convolving the images with the said matrix h(m).

8. A method according to claim 1, wherein the blur kernel is derived from a single image.

9. A system for reducing blur in an image of size greater than M columns by N rows of pixels, comprising a convolution processor arranged to convolve the image with a two dimensional matrix h(m) over the whole image in the image spatial domain to produce an image with reduced blur,
wherein the matrix h(m) is derived from a blur kernel k representing the blur in the image as an inverse blur kernel $k^{-1}$ where $$k^{-1} = h(m) = \sum_{n=0}^{m} (\delta - k)^n$$

where h(m) is the sum of the first m terms of the series $$\sum_{n=0}^{m} (\partial - k)^n,$$

δ is the Dirac delta, m is greater than 1, and h(m) is a two dimensional matrix of size M×N.

10. A system according to claim 9, further comprising a spatial filter arranged to reduce spatial noise in the image prior to convolving the image with the said matrix h(m).

11. A system according to claim 9, further comprising a temporal filter arranged to reduce temporal noise in the image after convolving the image with the said matrix h(m).

12. A system according to claim 9, wherein the convolution processor comprises a graphics processor.

13. A system according to claim 9, reducing blur in a video sequence and, further comprising a temporal filter arranged to reduce temporal noise in the sequence prior to convolving the sequence with the said matrix h(m).

14. A non-transitory computer readable medium including machine readable instructions that when executed by a processor reduce blurring in an image of size greater than M columns by N rows of pixels, wherein the instructions comprise instructions to:
derive a blur kernel k representing the blur in the image,
deriving an inverse blur kernel $k^{-1}$ where $$k^{-1} = h(m) = \sum_{n=0}^{m} (\delta - k)^n$$

where h(m) is the sum of the first m terms of the series $$\sum_{n=0}^{m} (\partial - k)^n$$

δ is the Dirac delta, 2≤m≤20, and h(m) is a two dimensional matrix of size M×N; and
convolve the two dimensional matrix h(m) over the whole image in the image spatial domain to produce an image with reduced blur.

15. A non-transitory computer readable medium according to claim 14, wherein the matrix is convolved with the image as two one dimensional matrices.

* * * * *